United States Patent [19]

Inouye

[11] 4,296,935
[45] Oct. 27, 1981

[54] MECHANICAL SEAL

[75] Inventor: Hiroshi Inouye, Minorimachi, Japan

[73] Assignee: Hitachi, Ltd., Tokyo, Japan

[21] Appl. No.: 83,340

[22] Filed: Oct. 10, 1979

[30] Foreign Application Priority Data

Oct. 9, 1978 [JP] Japan .............................. 53-123620

[51] Int. Cl.³ .................... F16J 15/34; F16J 15/48
[52] U.S. Cl. .................................. 277/81 R; 277/27;
277/93 SD
[58] Field of Search .................. 277/81 R, 82, 85, 83,
277/86, 93 R, 93 SD, 3, 27

[56] References Cited

U.S. PATENT DOCUMENTS

| 2,984,507 | 5/1961 | Welch | 277/65 X |
| 3,184,244 | 5/1965 | Van Vleet | 277/93 X |
| 3,218,110 | 11/1965 | Conner | 277/85 X |
| 3,921,986 | 11/1975 | Geary et al. | 277/83 |
| 4,007,940 | 2/1977 | Chapa | 277/93 R X |
| 4,114,900 | 9/1978 | Wiese | 277/93 SD X |

FOREIGN PATENT DOCUMENTS

| 1049649 | 1/1959 | Fed. Rep. of Germany | 277/86 |
| 1334206 | 6/1963 | France | 277/93 |
| 900064 | 7/1962 | United Kingdom | 277/93 |
| 1447569 | 8/1976 | United Kingdom | 277/93 |

Primary Examiner—Robert S. Ward, Jr.
Attorney, Agent, or Firm—Craig and Antonelli

[57] ABSTRACT

In a mechanical seal for the rotary shaft of a rotary machine wherein the pressure difference between the internal and external liquids acting on the mechanical seal changes from positive to negative, and vice versa, a ring and a seat ring are formed with mating seal faces which coact to seal between the internal and exterior liquid present externally and internally, respectively, of the retainer; the seat ring is securely and liquid-tightly mounted on the rotary shaft for rotation therewith in a casing; the ring is fitted over a retainer axially movably, but nonrotationally and is normally pressed against the seat ring under the force of a bias spring which provides the sealing force for maintaining the seal between the seal faces when the external liquid pressure exceeds the internal liquid pressure, but the pressure difference is relatively small; the retainer in turn is mounted in the casing nonrotationally but axially movably due to the difference in pressure between the internal and external liquids, whereby regardless of the difference in pressure between the internal and external liquids, the seal may be maintained securely.

2 Claims, 6 Drawing Figures

MECHANICAL SEAL

BACKGROUND OF THE INVENTION

The present invention relates generally to a mechanical seal for the rotary shaft of a rotary machine for preventing the leakage of an internal liquid and more particularly a mechanical seal capable of attaining and maintaining reliable seal performance regardless of the positive and negative pressure difference between the internal and external liquids as encountered in compressors and pumps.

With the conventional stationary balanced type mechanical seals to be described in detail below, when the internal liquid pressure (the pressure of the liquid present internally of the mechanical seal) is higher than the exterior liquid pressure (the pressure of the liquid present externally of the mechanical seal), the satisfactory seal may be maintained, but when the external liquid pressure exceeds the internal liquid pressure, the force for forcing the seal face of a nonrotating ring to press against the mating seal face of a rotating ring mounted on the shaft becomes lower than the reaction due to the hydrodynamic pressure in film formed between the seal faces so that the seal faces are separated from each other and the leakage occurs.

SUMMARY OF THE INVENTION

In view of the above, the primary object of the present invention is to provide a mechanical seal capable of attaining and maintaining reliable seal not only when the internal liquid pressure is higher than the external liquid pressure but also when the external liquid pressure exceeds the internal liquid pressure.

To the above and other ends, briefly stated, the present invention provides a mechanical seal for sealing the rotating shaft of a rotary machine wherein the difference in pressure between the internal and external liquids acting on the mechanical seal changes from positive to negative and from negative to positive, characterized in that a ring and seat ring are formed with mating seal faces which coact to seal between the internal and external liquids present externally and internally, respectively, of the ring; the seat ring is securely and liquid-tightly mounted on the rotating shaft for rotation therewith in a casing; the ring is fitted over a retainer axially movably, but nonrotationally and is normally pressed against the seat ring under the force of a bias spring which provides the sealing force for maintaining the seal between the seal faces when the external liquid pressure exceeds the internal liquid pressure, but the pressure difference is relatively small; the retainer in turn is closely fitted into the cylindrical bore of the casing nonrotatably, but axially movable due to the difference in pressure between the internal and external liquids; O-rings are interposed between the axially movable but nonrotatable ring and retainer and between the retainer and the bore wall of the casing; and nonrotational stop means are provided for preventing the rotation of the ring and retainer, whereby when the internal liquid pressure is higher than the external liquid pressure, the combined force of the pressure of the internal liquid acting on the ring and the spring force of the bias spring forces the axially movable ring to press against the seat ring; when the external liquid pressure exceeds the internal liquid pressure, the axially movable ring is kept pressed against the seat ring mainly under the force of the bias spring; and when the external liquid pressure further exceeds the internal liquid pressure, the external liquid pressure acts on the retainer in such a way that the retainer is forced to move toward and push the axially movable ring which in turn is forced to press against the seat ring. Thus, regardless of the difference in pressure between the internal and external liquids, the liquid-tight seal may be attained and maintained in a reliable manner.

Remarkable sealing effects can be attained when the mechanical seal of the present invention is applied to a boil-off gas turbocompressor for liquefied natural gas in which the internal gas pressure rises immediately when the rotary shaft is stopped (the internal gas pressure corresponding to the external liquid pressure) because the leakage of the liquefied natural gas (corresponding to the external liquid) may be positively prevented.

BRIEF DESCRIPTION OF THE DRAWINGS

Same reference numerals are used to designate similar parts throughout the figures.

DESCRIPTION OF THE PREFERRED EMBODIMENT

Figure 1:
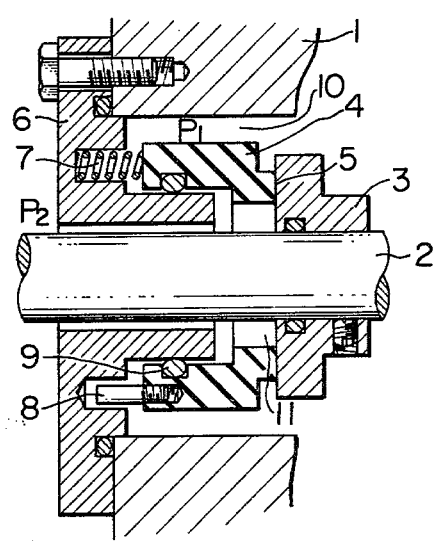
FIG. 1 is an axial sectional view of a prior art mechanical seal.
Figure 2:
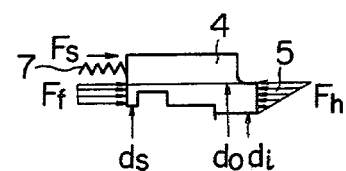
FIGS. 2 and 3 are views used for the explanation of the mode of operation thereof.
Figure 3:
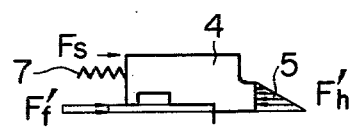

Prior Art, FIGS. 1 through 3

Prior to the description of the preferred embodiment of the present invention, a prior art mechanical seal will be described briefly with reference to FIGS. 1 through 3 in order to specifically and distinctly point out the problems thereof. The mechanical seal shown in FIG. 1 is the so-called stationary balanced type wherein an axially movable ring 4 is mounted on a casing 1 and comprises the casing 1, a rotary shaft 2, a seat ring 3 securely mounted on the shaft 2, the axially movable ring which coacts with the seat ring 3 to provide seal faces 5 and is mounted on a retainer 6 for axial movement, a bias spring 7 loaded between the retainer 6 and the annular outward surface of the ring 4 for normally biasing the ring 4 against the seat ring 3, a stop pin 8 fitted into mating pin holes drilled in the retainer 6 and the ring 4 so as to prevent the rotation of the ring 4 about the axis of the rotary shaft 2 and a secondary seal or O-ring 9 interposed between the ring 4 and the retainer 6.

The mechanical seal of the type described is effective only when the pressure $P_1$ of the internal liquid 10 is higher than the pressure $P_2$ of the external liquid 11 as will be described in detail below with reference to FIG. 2. That is, the outer diameter $d_o$ and the inner diameter $d_i$ of the seal faces 5 and the inner diameter $d_s$ of the annular outward surface of the movable ring 4 are determined so as to satisfy Eq. (1) because the pressure of the internal liquid 10 rises to a high level.

$$F_f + F_s > F_h \qquad (1)$$

where $F_f$ = the force acting on the movable ring 4 due to the pressure of the internal liquid;

$F_s$ = the force of the bias spring 7 acting on the annular outward end surface of the movable ring 4; and $F_h$ = the reaction due to the hydrodynamic pressure in film formed by the internal liquid forced into the sealing surface 5.

When the above-mentioned condition (1) is satisfied, no internal liquid 10 even at high pressures will not leak into the passage of the external liquid 11 through the seal faces 5.

However, when the pressure $P_1$ of the internal liquid 10 drops below the pressure $P_2$ of the external liquid 11, the force $F_f$ and the force $F_h$ change to $F_f'$ and $F_h'$, respectively, as shown in FIG. 3, and the following relation or condition is held.

$$F_f' + F_s < F_h' \qquad (2)$$

That is, the sealing force $(F_f' + F_s)$ becomes less than the reaction $F_h'$ acting on the seal face 5 of the movable ring 4 so that the seal faces 5 are separated from each other. As a result, the external liquid leaks into the passage of the internal liquid 10 through the enlarged clearance between the seal faces 5. Thus when the pressure $P_1$ of the internal liquid 10 drops below the pressure $P_2$ of the external liquid 11, the mechanical seal fails. In order to overcome this problem, it has been proposed to increase the strength $F_s$ of the bias spring 7, but the result is that the overall sealing force $F_f + F_s$ rises too high, damaging the seal faces 5.

Figure 4:
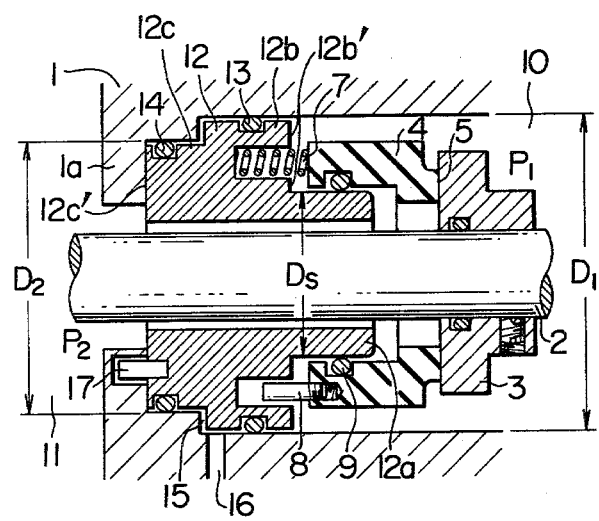
FIG. 4 is an axial sectional view of a preferred embodiment of a mechanical seal in accordance with the present invention.
Figure 5:
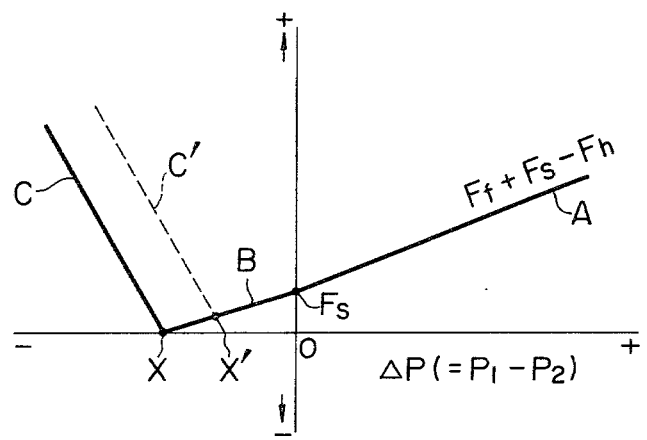
FIG. 5 is a graph depicting the relationship between the pressure difference between the internal and external liquids and the sealing force or seal performance attained by the mechanical seal of the present invention.
Figure 6:
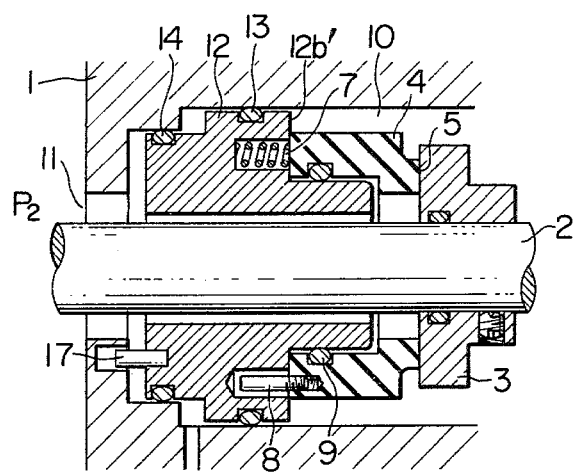
FIG. 6 is a view similar to FIG. 4 used for the explanation of the mode of operation of the mechanical seal of the present invention.

The Invention, FIGS. 4 through 6

The present invention was made to overcome the above-described problem encountered in the prior art mechanical seals. In FIG. 4 is shown one preferred embodiment of a mechanical seal in accordance with the present invention. An axially movable ring 4 which coacts with a seal ring 3 to provide seal faces 5 is fitted over a retainer 12 with a secondary seal or O-ring 9 interposed therebetween. A stop pin 8 in is fitted into the holes drilled in the annular outward end face of the axially movable ring 4 and the annular inward end face of the retainer 12 so that the rotation of the axially movable ring 4 about the axis of the rotary shaft may be prevented, but the axial movement of the ring 4 may be permitted. A bias spring 7 is loaded between the ring 4 and the retainer 12.

The retainer 12 consists of a reduced-diameter inward portion 12a over which is fitted the axially movable ring 4, an enlarged-diameter intermediate portion 12b whose peripheral surface is made into close contact with the inner wall surface of the casing 1 with an O-ring 13 interposed therebetween, and a reduced-diameter outward portion 12c whose peripheral surface is made into close contact with the inner wall surface of the casing 1 with an O-ring 14 interposed therebetween and whose annular outward end face 12c' is abutted against the annular flange 1a of the casing 1. In order to prevent the rotation of the retainer 12, a stop pin 17 is fitted into the holes drilled in the annular outward end face 12c' of the retainer 12 and the inner face of the flange 1a, respectively.

The annular inward face 12b of the enlarged-/diameter portion 12b of the retainer is exerted with the pressure $P_1$ of the internal liquid 10 while the annular end face 12c' of the retainer 12 is exerted with the pressure $P_2$ of the exterior liquid 11. When the pressure $P_1$ of the internal liquid 10 is higher than the pressure $P_2$ of the external liquid 11, the annular outward end face 12c' of the retainer 12 is pressed against the flange 1a of the casing 1. A space 15 between the enlarged-/diameter intermediate portion 12b and the reduced-diameter outward portion 12c of the retainer 12 and the casing 1 is sealed by the O-rings 13 and 14 from the internal and external liquids 10 and 11 and is communicated with the surrounding atmosphere through an air vent passage 16 formed through the casing 1. Otherwise the air would be trapped in this space 15 so that the axial movement of the retainer would not be permitted.

The outer diameters $D_s$, $D_1$ and $D_2$ of the reduced-diameter inward portion 12a, the enlarged-/diameter intermediate portion 12b and the reduced-diameter outward portion 12c of the retainer 12 and the pressures $P_1$ and $P_2$ of the internal and external liquids 10 and 11 must satisfy the following relations.

When $P_1 > P_2$ \qquad (3)

When $P_1 > P_2$ \qquad (4)

In the embodiment shown in FIG. 4, the enlarged-diameter portion 12b and the reduced-diameter outward portion 12c of the retainer are shown as having different outer diameters $D_1$ and $D_2$, but it is to be understood that they may have the same diameter. That is, the retainer 12 may consist of the reduced-diameter portion 12a and the enlarged-diameter portion 12b.

When the negative pressure acts on the mechanical seal; that is, when $P_1 < P_2$, the reaction $F_h'$ acting on the seal faces 5 must be taken into consideration so that the following relation or condition must be satisfied.

$$\pi/4\{(D_2^2 - D_s^2) \cdot P_2 - (D_1^2 - D_s^2) \cdot P_1\} \\ -F_s + \pi/4\}(d_o^2 - d_s^2) \cdot P_2 - (d_o^2 - d_i^2) \cdot P_1\} \\ +F_s > F_n' \qquad (5)$$

The outer diameter $D_2$ of the reduced-diameter outward portion 12c of the retainer must be so determined that not only the relation $D_2 \leq D_1$ but also the condition (5) may be satisfied.

The seal performance of the mechanical seal of the present invention will be described with reference to FIG. 5. Plotted along the abscissa is the pressure difference $\Delta P \, (=P_1 - P_2)$. The $\Delta P$ is positive when the internal liquid pressure $P_1$ is higher than the external liquid pressure $P_2$, but is negative when the external liquid pressure $P_2$ is higher than the internal liquid pressure $P_1$. Plotted along the ordinate is the sealing force or seal performance S which is positive when the seal faces 5 are pressed against each other, whereby the liquid-tight seal may be attained, but is negative when the seal faces are separated from each other, resulting in the leakage.

Still referring to FIG. 5, the line segment A indicates the sealing force or seal performance when $\Delta P$ is positive while the line segment B, when $\Delta P$ is negative, but relatively low in magnitude. Along the line segment B, the seal is maintained mainly by the force $F_s$ of the bias spring 7. Along the line segment C, the retainer 12 mainly maintains the seal between the seal faces 5 of the seal ring 3 and the axially movable ring 4. In FIG. 5, the seal characteristic line C is shown as intersecting the $\Delta P$ axis at X, but it may be displaced so that it may intersect the line segment B at X' as shown by the one-dot chain line C'.

Next further referring to FIGS. 5 and 6, the mode of operation of the mechanical seal with the above construction will be described in more detail. When the internal liquid pressure $P_1$ is higher than the external liquid pressure $P_2$, the retainer 12 is forced to move to the left and is pressed against the flange 1a of the casing 1 as best shown in FIG. 4. As shown in FIG. 2, the combined force of the spring force Fs and the force $F_f$ which the internal liquid 10 exerts to the annular outward face of the retainer forces the seal face 5 of the retainer 4 to press against the mating seal face 5 of the seat ring 3 against the reaction $F_h$ due to the hydrodynamic pressure in the film formed between the seal faces 5. As the pressure difference ΔP increases, the sealing force S is increased as indicated by the line segment A in FIG. 5.

When the pressure difference ΔP becomes negative but is not so great, the sealing force will not drop suddenly as indicated by the line segment B in FIG. 5 so that no leakage results.

When the negative pressure difference ΔP increases and reaches to the point X, the pressure P-2 acting on the annular outward end face 12c' of the retainer 12 forces the retainer 12 to move to the right away from the flange 1a of the casing 1 as shown in FIG. 6 so that the annular forward end face 12b' of the retainer is forced to abut against the annular outward end face of the axially movable ring 4 and consequently the bias spring 7 is compressed. The axially movable ring 4 in turn is pressed forcibly against the seat ring 3 so that the tight seal may be maintained. In this case, the sealing force S increases with increase in the external liquid pressure $P_2$ as indicated by the line segment C in FIG. 5.

What is claimed is:

1. A mechanical seal for sealing the rotary shaft of a rotary machine wherein the pressure difference between the internal and external liquid acting on said mechanical seal changes from positive to negative or from negative to positive, CHARACTERIZED in that
   an axially movable but nonrotatable ring and a seat ring are formed with seal faces which coact to seal between the internal liquid present externally of a retainer and the external liquid present internally of said retainer,
   said seat ring is liquid-tightly and securely mounted on said rotary shaft,
   said retainer is disposed for axial movement, but is prevented from rotating about the axis of said rotary shaft by a bias spring and a stop means,
   said bias spring normally biases said retainer against said seat ring and provides the sealing force for pressing the seal face of said retainer against the seal face of said seat ring when the external liquid pressure becomes higher than the internal liquid pressure, but the difference therebetween is small and less than a predetermined level, said retainer is disposed within a casing and is forced to move axially depending upon the difference in pressure between the internal and external liquids, and
   O-rings are interposed between the casing and the retainer and between the retainer and the axially movable, but nonrotatable ring.

2. A mechanical seal as set forth in claim 1 further characterized in that said retainer has
   a reduced-diameter outward portion of diameter $D_2$,
   an inward portion having a reduced-diameter $D_s$, and
   an intermediate portion of enlarged-diameter $D_1$ wherein $D_1 \geq D_2 > D_s$ such that
   one end face of said retainer has such an area that when the external liquid pressure rises above the internal liquid pressure, the pressure of said external liquid acting on said one end face of said retainer may force said retainer to press against said seat ring against the combined force of the pressure of said internal liquid acting on said retainer and the reaction due to the hydrodynamic force in film formed between said seal faces of said retainer and said seat ring.

* * * * *